(12) United States Patent
Huber et al.

(10) Patent No.: US 8,530,569 B2
(45) Date of Patent: Sep. 10, 2013

(54) POLYMERIC DISPERSANTS AND DISPERSIONS CONTAINING SAME

(75) Inventors: Gregory T. Huber, Indian Springs, OH (US); Tatiana N. Romanova, Loveland, OH (US); Russel J. Schwartz, Cincinnati, OH (US); Terence R. Chamberlain, Montgomery, OH (US)

(73) Assignee: Sun Chemical Corporation, Fort Lee, NJ (US)

( * ) Notice: Subject to any disclaimer, the term of this patent is extended or adjusted under 35 U.S.C. 154(b) by 2116 days.

(21) Appl. No.: 10/730,214

(22) Filed: Dec. 5, 2003

(65) Prior Publication Data

US 2008/0033102 A1 Feb. 7, 2008

(51) Int. Cl.
*C08F 8/30* (2006.01)

(52) U.S. Cl.
USPC .............. 524/555; 524/81; 524/86; 524/87; 524/88; 524/89; 524/90; 524/496

(58) Field of Classification Search
USPC .............. 252/301; 524/555, 496, 81, 86, 524/87, 88, 89, 90
See application file for complete search history.

(56) References Cited

U.S. PATENT DOCUMENTS

| | | | |
|---|---|---|---|
| 3,966,059 A | 6/1976 | Sase | 214/8.5 SS |
| 3,996,059 A | 12/1976 | Stansfield et al. | 106/308 N |
| 4,028,128 A | 6/1977 | Robertson | 106/308 Q |
| 4,057,436 A | 11/1977 | Davies et al. | 106/288 Q |
| 4,224,212 A | 9/1980 | Topham | 260/33.6 R |
| 4,309,320 A | 1/1982 | Arora et al. | 260/23 R |
| 4,340,341 A | 7/1982 | Cardell | 425/72 S |
| 4,391,648 A | 7/1983 | Ferrill, Jr. | 106/308 M |
| 4,461,647 A | 7/1984 | Schofield et al. | 106/308 N |
| 4,468,255 A | 8/1984 | Schwartz et al. | 106/288 Q |
| 4,496,686 A | 1/1985 | Ansel | 524/850 |
| 4,765,841 A | 8/1988 | Vinther et al. | 106/402 |
| 4,859,210 A * | 8/1989 | Franz et al. | 44/333 |
| 4,859,247 A * | 8/1989 | Foye et al. | 106/505 |
| 5,286,873 A | 2/1994 | Cook | 548/522 |
| 5,336,314 A | 8/1994 | Lamers | 106/506 |
| 5,429,841 A | 7/1995 | Batlaw et al. | 427/288 |
| 5,540,851 A | 7/1996 | Lange | 508/194 |
| 5,633,326 A * | 5/1997 | Patil et al. | 525/327.6 |
| 5,645,636 A | 7/1997 | Schneider et al. | 106/493 |
| 5,688,312 A | 11/1997 | Sacripante et al. | 106/31.49 |
| 5,714,090 A * | 2/1998 | Waters et al. | 252/301.35 |
| 5,882,393 A | 3/1999 | Quednau et al. | 106/287.2 |
| 5,935,315 A | 8/1999 | Bostrom | 106/499 |
| 6,037,414 A | 3/2000 | Simms et al. | 525/176 |
| 6,110,264 A | 8/2000 | Banning et al. | 106/31.29 |
| 6,290,768 B1 | 9/2001 | Metz et al. | 106/493 |
| 6,476,096 B1 | 11/2002 | Molloy et al. | 523/160 |
| 6,540,825 B1 | 4/2003 | Quinn et al. | 106/476 |
| 6,821,335 B2 * | 11/2004 | Winter et al. | 106/498 |

FOREIGN PATENT DOCUMENTS

| | | |
|---|---|---|
| JP | 02219866 | 3/1990 |
| JP | 02-219866 | 9/1990 |
| WO | WO 02/34840 A1 | 5/2002 |
| WO | WO/0234840 * | 5/2002 |

* cited by examiner

*Primary Examiner* — Gregory Listvoyb

(74) *Attorney, Agent, or Firm* — Frost Brown Todd LLC

(57) ABSTRACT

A polyalkyl benzimide polymeric dispersant produced from the reaction product of polyisobutylene amine with 1,2,4-benzenetricarboxylic anhydride, and method of preparing same and colorant dispersions containing dispersant.

23 Claims, 1 Drawing Sheet

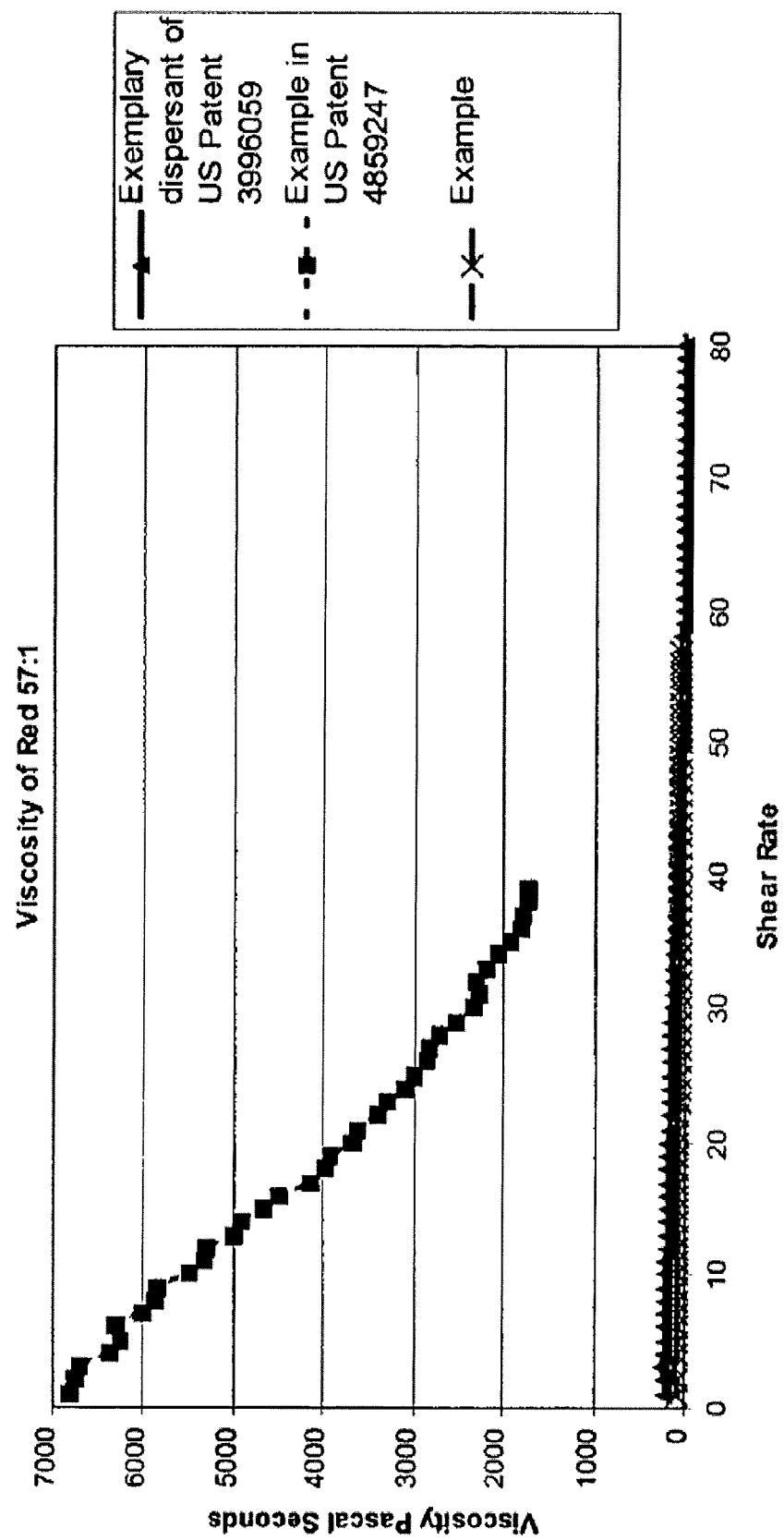

POLYMERIC DISPERSANTS AND DISPERSIONS CONTAINING SAME

FIELD OF THE INVENTION

This invention relates to a polymeric dispersant and highly colorant dispersions containing same for use in formulating printing inks and other hydrocarbon systems.

BACKGROUND OF THE INVENTION

Colorant dispersions require low viscosity, which may be accomplished through certain dispersants. By lowering the viscosity, more colorant may be added, affording very concentrated dispersions which can be satisfactorily handled and dispersed. Dispersions with high colorant content provide a number of advantages to for example, a printing ink manufacturer seeking to employ the dispersion, such as greater formulating latitude which permits the production of a greater variety of printing inks, cost reduction and lower inventory volumes.

The upper limit for the colorant concentration in a dispersion is determined by the resulting viscosity of the dispersion. As the colorant concentration increases linearly, the viscosity of the dispersion increases exponentially. If the viscosity becomes too high, the colorant concentrate can no longer be dispersed satisfactorily or easily handled during the ink manufacturing process. In addition, as the colorant concentration and resultant viscosity increases, the ink system experiences increasing heat build up due to frictional forces, during the dispersion process. This will be detrimental to the quality of ink as the increase in temperature will cause the degradation of certain colorants. Additionally, without proper control, lithography problems such as over-emulsification occur, which is when the ink takes up excessive fountain solution causing poor ink transfer, blanket piling, high dot gain, and misting; scumming, which is the inability of fountain solution to keep the non-image area of the printing plate clean and which is not easily washed from the plate; and feedback, which is the contamination of fountain solution during the printing process resulting in poor final print quality.

U.S. Pat. Nos. 4,859,247, 4,224,212, 4,057,436 and 3,996,059 describe oil-soluble viscosity-reducing salts or cationic dispersant additive materials. Incorporation of these additives allow for an increase in pigment concentration in the respective dispersions but their "surfactant-like" properties create a low interfacial tension, a very large relative interfacial tension drop in the oil-water ink system and lithographic printing problems (e.g. over-emulsification, scumming, or feedback). U.S. Pat. No. 6,540,825 describes a pigment dispersion which is the reaction product of an alkanolamine and a hydrocarbyl succinic anhydride compound to be used in aqueous and/or non-aqueous media. However, the dispersion suffers from low pigment strength and has less than 45 wt. % pigment in final dispersion. U.S. Pat. No. 6,290,768 discloses a pigment concentrate made up of 50-90 wt. % pigment reacted with large amounts of natural resins or natural resin acids, monocyclic or polycyclic phenols, and small amounts of aldehydes or aldehyde acetals, groups Ia and IIa metal compounds, alpha, beta-ethylenically unsaturated carboxylic acids or their anhydrides. While this pigment dispersion preparation has good flow, it has high viscosity which creates ease of handling problems. U.S. Pat. No. 5,935,315 discloses low viscosity aqueous pigment dispersions free of organic solvents that contain a fatty amidoalkoxylate dispersant. The $C_9$-$C_{19}$ polymer contains a $C_2$-$C_3$ hydrocarbon moiety or alkyleneoxy group. U.S. Pat. No. 5,882,393 discloses a dispersing agent or the salt of polyisocyanates reacted to a heterocyclic ring and a $C_2$-$C_5$ acrylate or epoxide moieties. Dispersants that contain such salts exhibit poor lithographic printing performance. U.S. Pat. No. 5,645,636 discloses a 5-50 wt. % pigment concentrated base and a dispersant of arylpararosanillnesulfonic acids. The dispersant is the condensation product of aliphatic amines or ammonium compounds and polyesters of hydroxyl fatty acids. U.S. Pat. No. 5,688,312 discloses a hot melt ink composition containing polymeric imides or bisimides made by reacting $C_2$-$C_{30}$ polyalkyleneoxide with a derivative of phthalic anhydrides or succinic anhydrides. U.S. Pat. No. 5,336,314 and WO 02/34840 A1 both describe dispersants, however neither resulting dispersing vehicles can be used in conventional flush systems. U.S. Pat. No. 5,336,314 discloses reacting phthalic anhydride with a polyester polymer. WO 02/34840 A1 discloses a phthalic acid imide with a $C_{30}$ maximum chain polyalkyl length for use in water-based systems. U.S. Pat. No. 5,429,841 discloses an ink composition containing 0.1 to 15 wt. % of polyoxyalkylene substituted colorants. U.S. Pat. No. 4,859,247 discloses an oil-soluble viscosity-reducing additive made by combining a long chain aliphatic amine having a molecular weight between 80 and 340 and a polybasic organic acid having a molecular weight between 50 and 250 in the form of salt. Incorporation of the additive allows increase pigment concentration in dispersion of up to 65 wt. %. However, these types of salts create significant problems in lithography such as scumming and feedback. U.S. Pat. No. 4,765,841 describes a preparation of organic pigment dispersion in a non-aqueous medium directly from aqueous slurry of the pigment. Dispersants are selected from resins, alkyds and mixed amide/salt-derivatives of polyesters derived from hydroxycarboxylic acids. These dispersants cause a substantial decrease in interfacial tension and cause the aforementioned scumming, feedback and over-emulsification problems. U.S. Pat. No. 4,468,255 discloses that diazo and azo linkage Schiffs bases reacted with polyoxyalkane polymeric chains can be used as a rheological modifier for pigment dispersions. U.S. Pat. No. 4,461,647 discloses a non-aqueous pigment dispersant comprising a diazo compound that contains a single substituted ammonium-acid salt group. In general, salts create significant problems in lithography such as scumming and feedback. U.S. Pat. No. 4,391,648 discloses a solid particulate granular pigment composition which is readily dispersible in oleoresinous vehicle systems made of from 25 to 95 wt. % of at least one pigment; from 1 to 15 wt. % of a cationic surfactant or blend of surfactants; and from 5 to 75 wt. % of a water-soluble, non-crystalline, friable, thermoplastic polyester resin having a hydroxyl value of 75-150 mg. The surfactants placed in the dispersion cause scumming and feedback. U.S. Pat. Nos. 4,340,341 and 4,309,320 both describe a preparation of an organic pigment dispersion in a non-aqueous medium from an aqueous slurry of the pigment by incorporating an additive selected from the class of sulfonated sperm oil and sulfated sperm oil. However, the pigment load is low at about 35-40 wt. % and 10 wt. % respectively. U.S. Pat. No. 4,057,436 discloses a pigment dispersion with between 5-70 wt. % pigment using a quaternary ammonium salt of a monomeric colored acid wherein there are from 19 to 60 atoms contained in the 4 chains attached to the N-atom of the quaternary ammonium ion. Quaternary ammonium compounds tend to cause the aforementioned lithographic problems and low interfacial tension. U.S. Pat. No. 4,028,128 describes a pigment dispersion which contains a carboxy ester between 5-200 wt. % off pigment in organic liquids useful for paints, lacquers and gravure inks. However, pigment concentrations are low. U.S. Pat. No. 3,966,059 discloses a dispersion of pigment content from 5-50 wt. % and with a dispersion agent with the formula Y—CO—B—A—R. The dispersions greatly suppress interfacial tension and result in poor lithographic performance. U.S. Pat. No. 6,037,414 describes a graft polymer having acrylic polymer backbone and pending from this backbone polyester side chains, cyclic imides, and quaternary ammonium groups. These molecules range in molecular weight from 8,000-50,000. The dispersants described are well known ammonium groups which cause problems in lithographic performance such as scumming and feedback during the printing process.

As indicated hereinabove, the prior art has disclosed colorant dispersions with more than 45 wt. % pigment and viscosities less than 150 Pa·s, however, when used in lithography, said dispersions have been known to cause problems (e.g. pigment over-emulsification, scumming, or feedback). Thus, there exists a need for a dispersant that lowers the viscosity of highly concentrated non-polar colorant dispersions, while preserving a high colorant concentration.

Further, there exists a need for a highly colorant dispersion which has the properties cited above while only employing a relatively small amount of dispersant.

Finally, there exists a need for a dispersant which is dust-free and therefore easy to dispense.

SUMMARY OF THE INVENTION

It has now been found that the above-mentioned objectives can be realized by employing an easily dispensable dust-free polyalkyl benzimide dispersant produced by the reaction product of a polyisobutylene amine with 1,2,4-benzenetricarboxylic anhydride.

The present invention also provides a method of preparing a polyalkyl benzimide dispersant produced by reacting a polyisobutylene amine with 1,2,4-benzenetricarboxylic anhydride. The reaction occurs at a temperature sufficient to dissolve the 1,2,4-benzenetricarboxylic anhydride then further heating the mixture to react at a temperature of at least 140° C. under vacuum.

The present invention provides a colorant dispersion composition containing at least about 45 wt. % colorant and the above dispersant.

The present invention also provides a method of lowering the viscosity of a colorant dispersion to less than about 150 Pa·s. at a high colorant concentration and containing the above dispersant.

The present invention further provides a lithographic and/or gravure printing ink composition comprising a colorant dispersion composition containing the above dispersant.

Other objects and advantages of the present invention will become apparent from the following description and appended claims.

BRIEF DESCRIPTION OF THE FIGURE

The accompanying drawing, which is incorporated in and constitute a part of this specification, illustrate embodiments, and together with the general description given above, and the detailed description of the embodiments given below, serve to explain the principles of the present disclosure.

FIG. 1 is a graph of viscosity and shear rates for Red 57:1.

DETAILED DESCRIPTION OF THE INVENTION

In accordance with the present invention a polyalkyl benzimide polymer dispersant has been surprisingly discovered by reacting a polyisobutylene amine with 1,2,4-benzenetricarboxylic anhydride. The dispersant is particularly suitable for use in non-polar highly concentrated colorant systems, and is particularly suitable for preparing lithographic and/or gravure printing inks. The dispersant can be prepared using an economical one pot process and a small amount of dispersant is notably required to provide these advantage.

Typical polyisobutylene amines suitable for use in the present invention include FD-100 and Kerocom Piba03 both available from BASF, (Mount Olive, N.J.). The polyisobutylene amine is typically packaged in oil, which optionally may be removed prior to reacting amine with the 1,2,4-benzenetricarboxlic anhydride. Alternatively, the oil may be removed during the reaction process, or left with the reaction product. The polyisobutylene amine and the 1,2,4-benzenetricarboxlic anhydride react to form the polyalkyl benzimide polymer dispersant.

The polyalkyl benzimide polymer dispersant of the present invention is preferably prepared by mixing polyisobutylene amine with solid 1,2,4-benzenetricarboxylic anhydride at a temperature sufficient to allow the components to react. Preferably, the temperature is between 60° C. and 180° C., and more preferably between about 100° C. to about 160° C. The reaction is carried out under vacuum, and optionally takes place in the presence of a solvent.

While not being bound by theory, it is assumed that the combination of the polyisobutylene amine and an anhydride such as trimellitic anhydride forms a dispersant with an anchoring group, which is suitable for producing laked organic and inorganic pigments, and forms a polymeric tail, which is compatible with oil based systems.

The dispersant is used in colorant dispersions which include dyes, pigments combinations and conventional vehicles. A suitable pigment dispersion may be comprised of between about 40 wt. % to about 90 wt. % of an organic pigment, inorganic pigment, dye, or carbon black, preferably between about 45 wt. % to about 65 wt. %. Suitable pigments and dyes include, but are not limited to, Beta Napthol Pigment Lakes such as Pigment Red 49, Pigment Red 49:1, Pigment Red 49:2, Pigment Red 50:1, Pigment Red 51, Pigment Red 53, Pigment Red 53:1, Pigment Red 53:3, Pigment Red 68, Pigment Orange 16, Pigment Orange 17:1, Pigment Orange 46; BONA Pigment Lakes such as Red 48:1, Pigment Red 48:2, Pigment Red 48:3, Pigment Red 48:4, Pigment Red 48:5, Pigment Red 52:1, Pigment Red 52:2, Pigment Red 57:1, Pigment Red 58:2, Pigment Red 58:4, Pigment Red 63:1, Pigment Red 63:2, Pigment Red 64, Pigment Red 64:1, Pigment Red 200, Pigment Brown 5; Napthol AS Pigment Lakes such as Pigment Red 151, Pigment Red 237, Pigment Red 239, Pigment Red 240, Pigment Red 243, Pigment Red 247; and Naphthalene Sulfonic Acid Pigment Lakes such as Pigment Yellow 104, Pigment Orange 19, Pigment Red 60, Pigment Red 66, and Pigment Red 67.

The dispersant of the present invention significantly reduces viscosity of highly colored or pigmented dispersions when employed in amounts between about 1 wt. % to about 15 wt. %, based on weight of the pigment. It is preferred that the dispersant be used at about 10 wt. % based on the pigment weight.

Preferably, the colorant dispersion of the present invention has a relative interfacial tension drop of less than about 1.5 and a viscosity of less than about 150 Pa·s. Lowering the viscosity of the dispersions permits the inclusion of more colorant resulting in highly colored concentrates that still can be satisfactorily handled and dispersed in inks. Imparting increased capacity during the flushing process ensures improved performance and lower cost for the subsequent inks. Further, the colorant dispersions of the present invention have improved stability. The dispersant and colorant dispersions also exhibit the added advantage of preserving a low relative interfacial tension drop at the oil-water interface, thereby preserving the lithographic quality of the neat colorant concentrates afforded by a low-relative oil-water interface tension.

The dispersant is liquid and therefore is dust-free and easy to dispense. Further, the dispersant lowers the viscosity of highly concentrated non-polar colorant dispersions when employed in relatively small amounts (less than 10%) while also preserving a low relative interfacial tension drop at the oil-water interface for printing inks, thereby reducing scumming, feedback and over-emulsification printing problems in both lithographic and gravure printing.

The dispersant and pigment dispersions of the present invention are further illustrated by the following non-limiting examples in which all parts and percentages are by weight, unless otherwise indicated.

Example 1

Polyisobutylene amine (200 parts, FD-100 available from BASF in Wyandotte, Mich.) was heated under vacuum to 140° C. for 4 hours while stirring. 1,2,4-benzenetricarboxylic anhydride (12.39 parts, available from Aldrich Chemicals of Milwaukee, Wis.) was added and the mixture was maintained for 20 hours at a temperature of 140° C. while the 1,2,4-benzenetricarboxylic anhydride slowly melted, then reacted. The reaction mixture cooled to room temperature, producing a honey brown liquid with the following properties: Brookfield viscosity of 400000 cps at 3 R.P.M. (#4 spindle, 20° C.), amine number value of 0, and acid number value of 21.85.

Example 2

Seven different pigment dispersion compositions containing different types of pigments and dispersants were prepared and their rheological properties were tested. Each pigment dispersion composition was prepared in the following manner: 25 parts of a varnish (16.75 parts of a hydrocarbon resin (LX 1082-280; available from Neville Chemical of Pittsburgh, Pa.) and 8.25 parts of 47 oil (available from Magie Bros., Franklin Park, Ill.)), 20 parts of 47 Oil (available from Magie Bros., Franklin Park, Ill.), 50 parts of pigment, and 5 parts dispersant (if present) were combined together and mixed on a Hoover Muller Mixer at 3×50 revolutions. The viscosities of the resulting pigment dispersions were measured along with their effect on the relative interfacial tension of an oil-water ink system.

Viscosity Measurements

Rheological measurements were carried out using the following instruments and under the following conditions:

Rheometer: Haake RS100 controlled stress rheometer with cone and plate geometry. Measuring Geometry: Haake PP35H, parallel plate with a diameter of 35 mm. Temperature Control: Haake TC-501 electrical heater with temperature control to both cone and plate. Measurement mode: linear sweep from $10^{-1}$ to $100\ S^{-1}$ in 600 S. Measurement temperature: 25° C. (both cone and plate temperatures are controlled). Each pigment concentrate sample in the form of a paste was loaded on a lower stationary plate with a spatula. All samples were of virgin materials and no preshearing was carried out on the sample to emulate the actual bulking process. The lower stationary plate was then raised slowly to compress the sample against an upper plate (the cone) to reach a measurement position. The gap width was set to be 1 mm in all cases. Both upper and lower plates were pre-equilibrated to 25° C. before starting the measurement. The sample was subjected to a linear stress sweep at a shear rate ranging from 10 to 100 $S^{-1}$. For a more viscous sample, the experiment was terminated before reaching 100 $S^{-1}$ to avoid torque overloading of the machine. The data collection mode was logarithmic to emphasize the lower shear rate range. Both shear stress and shear rate data were collected to obtain viscosity information on the sample. Each pigment dispersion was run 2-3 times and an average viscosity was calculated.

Interfacial Tension Measurements

A glass jar (2 ounces) used to prepare the sample dispersion was tared on a balance and 50 grams of stainless steel shot was added. The balance was again tared and Magiesol (32.3 grams, available from Magie Bros., Franklin Park, Ill.) was added with the sample concentrate (1 gram). The jar was placed on a Harbil shaker for 15 minutes to disperse the sample concentrate in the oil. The shot was strained from the dispersion. The shaker was calibrated with a ball bearing of known size. A cuvette and syringe used during the measurement of the interfacial tension was cleaned with an industrial detergent followed by washing with copious amounts of deionized water and finally placed in an ultrasonic bath cleaner in the presence of deionized water. The sample was analyzed for interfacial tension versus a citric acid buffer continuous phase at pH=3.1 for 600 seconds.

The relative interfacial tension drop (RIFTD) was calculated from the following equation:

$$RIFTD = \frac{\gamma_i - \gamma_f}{\gamma_f}$$

where $\gamma_i$ and $\gamma_f$ represent the initial interfacial and final interfacial tension respectively of the sample.

Measurement Results

Table 1 and FIG. 1 show the results of the rheological testing and interfacial tension measurements in numerical and graphical display. The results indicate that the pigment dispersion compositions containing the dispersants of the present invention have significantly lower relative interfacial tension drop than pigment dispersion compositions containing no dispersant or dispersants known in the prior art. Further, the pigment dispersion composition containing the present invention dispersant has lower viscosity than that of either the pigment dispersion containing no dispersant, or dispersants known in the prior art.

TABLE 1

| Dispersant | Pigment Type | Pigment wt. % | Varnish wt. % | Dispersant wt. % | Oil wt. % | RIFTD | Viscosity (average Pa·s @ 1/s) |
|---|---|---|---|---|---|---|---|
| None | Red 57:1 | 50 | 25 | 0 | 25 | 0.09 | >8000 |

TABLE 1-continued

| Dispersant | Pigment Type | Pigment wt. % | Varnish wt. % | Dispersant wt. % | Oil wt. % | RIFTD | Viscosity (average Pa·s @ 1/s) |
|---|---|---|---|---|---|---|---|
| Comparative Example (U.S. Pat. 3,996,059) | Red 57:1 | 50 | 25 | 5[1] | 20 | >3.0 | 175 |
| Comparative Example (U.S. Pat. 4,859,247, Ex. 1) | Red 57:1 | 50 | 25 | 5 | 20 | >3.0 | 3780 |
| Example 1 | Red 57:1 | 50 | 25 | 5 | 20 | 0.63 | 80 |

[1]Solsperse 1700, available from Avecia of Charlotte, NC.

The invention has been described in terms of preferred embodiments thereof, but is more broadly applicable as will be understood by those skilled in the art. The scope of the invention is only limited by the following claims.

What is claimed is:

1. A polyalkyl benzimide polymeric dispersant consisting of the reaction product of a polyisobutylene amine with 1,2,4-benzenetricarboxylic anhydride, wherein the chain length of the polyisobutylene amine is such as to make the reaction product compatible with a non-polar colorant dispersion.

2. A colorant dispersion non-polar combination comprising at least about 40 wt. % of a colorant and the polyalkyl benzimide dispersant of claim 1.

3. The colorant dispersion of claim 2 having a viscosity of less than about 150 Pa·s.

4. The colorant dispersion of claim 2 wherein said colorant is selected from the group consisting of organic pigments, inorganic pigments, dyes and carbon black.

5. The colorant dispersion of claim 4 wherein said colorant is a laked organic pigment.

6. The colorant dispersion of claim 5 wherein said laked organic pigment is selected from the group consisting of beta napthol laked pigments, 2-hydroxy-3-naphthoic acid laked pigments, napthol laked pigments, and naphthalene sulfonic acid laked pigments.

7. The colorant dispersion of claim 5 wherein said laked organic pigment is selected from the group consisting of Pigment Red 49, Pigment Red 49:1, Pigment Red 49:2, Pigment Red 50:1, Pigment Red 51, Pigment Red 53, Pigment Red 53:1, Pigment, Red 53:3, Pigment Red 68, Pigment Orange 16, Pigment Orange 17:1, Pigment Orange 46, Red 48:1, Pigment Red 48:2, Pigment Red 48:3, Pigment Red 48:4, Pigment Red 48:5, Pigment Red 52:1, Pigment Red 52:2, Pigment Red 57:1, Pigment Red 58:2, Pigment Red 58:4, Pigment Red 63:1, Pigment Red 63:2, Pigment Red 64, Pigment Red. 64:1, Pigment Red 200, Pigment Brown 5, Pigment Red 151, Pigment Red 237, Pigment Red 239, Pigment Red 240, Pigment Red 243, Pigment Red 247, Pigment Yellow 104, Pigment Orange 19, Pigment Red 60, Pigment Red 66, and Pigment Red 67.

8. The colorant dispersion of claim 2 wherein 65 wt. % of colorant is present.

9. The colorant dispersion of claim 2 wherein 1 wt. % to about 15 wt. % of said dispersant is present.

10. The colorant dispersion of claim 2 wherein 10 wt. % of said dispersant is present.

11. A printing ink composition comprising the pigment dispersion of claim 2.

12. A printing ink composition of claim 11 wherein the printing ink is selected from the group consisting of lithographic and gravure printing ink.

13. A polyalkyl benzimide polymeric dispersant consisting of the liquid reaction product of a polyisobutylene amine with 1,2,4-benzenetricarboxylic anhydride, wherein the chain length of the polyisobutylene amine is such that a non-polar colorant dispersion in which the colorant concentration is about 40 to 90% and the reaction product concentration is about 1 to 15% has a viscosity of less than about 150 Pa·s and a relative interfacial tension drop of less than about 1.5.

14. A colorant dispersion non-polar combination comprising at least about 40 wt. % of a colorant and the polyalkyl benzimide dispersant of claim 13.

15. A colorant dispersion non-polar combination comprising at least about 45 wt. % of a colorant and the polyalkyl benzimide dispersant of claim 13.

16. The colorant dispersion of claim 14 wherein said colorant is selected from the group consisting of organic pigments, inorganic pigments, dyes and carbon black.

17. The colorant dispersion of claim 14 wherein said colorant is a laked organic pigment.

18. The colorant dispersion of claim 14 wherein 65 wt. % of colorant is present.

19. The colorant dispersion of claim 14 wherein 1 wt. % to about 15 wt. % of said dispersant is present.

20. The colorant dispersion of claim 14 wherein 10 wt. % of said dispersant is present.

21. A printing ink composition comprising the pigment dispersion of claim 14.

22. A printing ink composition of claim 21 wherein the printing ink is selected from the group consisting of lithographic and gravure printing ink.

23. A colorant dispersion non-polar combination comprising at least about 45 wt. % of a colorant and the polyalkyl benzimide dispersant of claim 1.

* * * * *